UNITED STATES PATENT OFFICE.

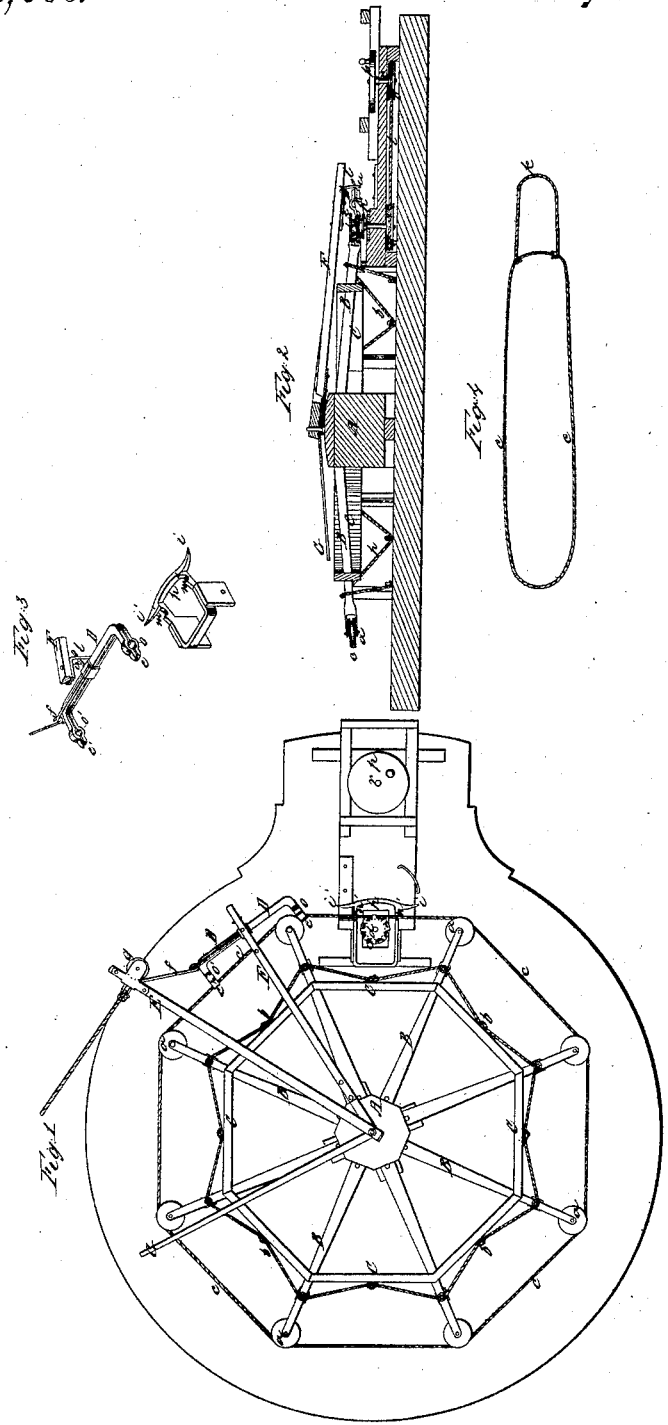

STUART PERRY, OF NEWPORT, ASSIGNOR TO CHARLES H. A. CARTER, OF NEW YORK, N. Y.

IMPROVEMENT IN CIRCUIT HORSE-POWERS.

Specification forming part of Letters Patent No. 35,063, dated April 22, 1862.

*To all whom it may concern:*

Be it known that I, STUART PERRY, of Newport, in the county of Herkimer and State of New York, have invented certain new and useful Improvements in Circuit Horse-Powers; and I do hereby declare the following to be a full, clear, and exact description of the same, reference being had to the accompanying drawings, making a part of this specification, in which—

Figure 1 represents a top plan of one of my horse-powers. Fig. 2 represents a longitudinal vertical section taken centrally through the same. Fig. 3 represents in perspective the clasp for seizing the rope or band and the device for releasing it, they being represented as detached from the machine. Fig. 4 represents an endless rope or band with the draw-strap attached, which I propose as a modification of that shown in Figs. 1 and 2.

Similar letters of reference, where they occur in the drawings, denote like parts of the machine in all cases.

In circuit horse-powers as heretofore constructed the team is hitched to the frame and the frame is moved round with the horses. In my construction the frame is stationary, and the team is hitched to an endless rope or band that moves around on the frame, and the power of this endless rope or band thus drawn around by the team is communicated to any machinery to be driven through a force-transmitting pulley or shaft.

My invention consists in the use of one, two, or more endless belts or bands in horse-power machines, to which the horse or horses are hitched, and the power of the team is communicated through these ropes or bands to a force-transmitting pulley or shaft, whence it may be taken to any machinery to be driven by it; and my invention further consists in providing suitable mechanical appliances for keeping this traveling rope or band in contact with the force-transmitting pulley or shaft, whether said rope has a "bite" or turn around said shaft or pulley or whether it but partially encircles it.

To enable others skilled in the art to make and use my invention, I will proceed to describe the same with reference to the drawings.

A represents a central stationary post or hub, having a series of radial arms, B, projecting therefrom, each arm, or so many thereof as are to sustain the traveling rope or band, being provided at its outer end with a friction-pulley, $a$. These arms may be braced, as shown at C, and further secured against lateral motion by "guys," as at $b$, and for the purpose of straining or tightening the rope or band that passes around the ends of these radial arms keys or wedges in the hub A for driving them out, or springs resting against their inner ends to force them out, may be used.

In Fig. 1 I have shown one effectual plan of using a traveling rope or band, to which the team is hitched, and which is drawn around a stationary frame-work, substantially such as above described.

$c$ is the endless rope or chain or band laid around the pulleys in the ends of the radial arms B, and having a turn or "bite" around a shaft or pulley, $d$. It is obvious in this arrangement that the device by which the horse or team is hitched to the endless rope or band must be disconnected just before it reaches the pulley or shaft, and connected again immediately after passing the pulley or shaft. Many ways of doing this may be devised. I, however, herein show one plan for effecting the purpose without referring to others.

D is a clasp, having spring-jaws $e\,e'$, which, when closed upon the rope, chain, or belt, will hold with sufficient tenacity to prevent slipping. This clasp may be connected to the drag-bar E by a link, $f$, or by a rope or chain passing around the pulley $g$ in said drag-bar, the two ends of said rope or chain being fastened to the clasp. Near the shaft or pulley $d$, I arrange a clasp-opener, $h$, made as follows:

$i\,i'$ are two curved horns or prongs, which open, hold open, and then allow to close on the rope or band the jaws $e\,e'$, respectively. When the front end of the clasp comes up to the clasp-opener, the point $i$ thereof enters into the opening $o'$ of the jaw $e'$, spreading said jaw, and releasing it from the rope or band $c$. The rope or band, however, resting in the guides $m'\,m'$, continues to be drawn along by the jaw $e$, which is still clasped to it. When the jaw $e'$ passes over and beyond the point $i'$, which it does before the jaw $e$ reaches the point $i$, it immediately closes upon the rope or band, and the jaw $e$ may be similarly opened, held open, and then closed upon the rope or band, thus, as it were, stepping the clasp past the place where the rope or band encircles the pulley or shaft without any stoppage or cessation of the draft of the team upon the rope. This clasp, instead of having two jaws connected to it, may be made in two separate pieces, each being opened, held open, and closed as it passes the point where the endless rope or band takes its bite or turn around the drum or pulley.

In Fig. 4 I have shown another form of endless rope, chain, or band which I propose to use. This form of rope, chain, or band does not encircle the entire pulley or shaft, but only partially so, enough, however, to cause the contact-friction to turn said pulley or shaft, and thus produce motion in it, and that the team when passing the force-transmitting shaft or pulley may not draw the rope or other endless band away from the shaft or pulley guides may be placed to keep up a constant contact; or two or more of these belts, whether of rope, leather, rubber, gutta-percha, or of metal, may be used at one and the same time, so that if the power of the team tends to draw the said rope or other thing away from the shaft or pulley at one point the other team or teams will draw their belts or bands more directly against it from other points.

In using this kind of belt, where there is no turn or bite around the shaft or pulley, the clasps are unnecessary, and the beam may draw from the strap or rope $k$, connected with it; and this kind of band or belt may pass around that side of the pulley or shaft most remote from the center of the arms B, or around the side nearest to the hub A, which is the common center of the arms B. In this latter case the draft of the team in passing the pulley or shaft $d$ would tend to draw the band against said shaft or pulley. Should a chain be used for the horses to draw by, a sprocket-wheel may be used on the drum or pulley for the links of the chain to take into to turn said shaft, pulley, or wheel, and in this case there would be no slip; but I prefer the band or belt made of some fibrous or flexible material other than metal as being cheaper and less liable to wear out.

The clasp D is kept in position by an arm, F, pivoted to the center of the hub A, and traveling around with it, there being a pin or bolt, $l$, on the outer side of said clasp, which passes through a hole in a projecting piece, $u$, on the under side of said arm F, and another radial traveling arm, G, may be used, connected with the arm F, to fasten the team to, so as to lead them around in the proper circuit.

Around the lower end of the shaft or pulley $d$ there is another pulley, $n$, around which and around a pulley, $o$, on a shaft, $r$, passes an endless belt, $t$. On the top of the shaft $r$ there is a pulley or crank-wheel, $p$, from which the power may be communicated to any machinery to be driven by it.

It is obvious that instead of the force-transmitting shaft or pulley being vertical, as shown in the drawings, it may be horizontal without changing the character of the invention.

Two ropes, bands, or chains may be used, one of which may not touch the force-transmitting shaft or pulley, but be used only to draw by, while the other rope, band, or chain may have a turn or bite on said shaft or pulley. These two endless bands should pass over different grooves in the same pulley, so that both tend to drive the force-transmitting shaft or pulley, although one of them does not or may not touch it; but it transmits its force and the force of the team or teams that draw it to its fellow rope or band, and this latter communicates the force to the shaft or pulley. The grooves in the pulleys may be furnished with ribs that will indent the rope, band, &c., to prevent it from slipping. For this construction of horse-power using two or more ropes, bands, or chains I propose to make a separate application for Letters Patent of the United States.

Having thus fully described my invention and shown how it may be practically applied, what I claim is—

1. In circuit horse-powers, the hitching of the team or teams to an endless belt or band that travels around with the team for the purpose of transmitting the power of the team to a pulley, shaft, or wheel, whence it may be applied to any machinery, substantially as described.

2. In combination with an endless belt or band that has a turn or bite around a drum, shaft, pulley, or wheel, a self-acting connecting and disconnecting mechanism, whereby the draft may be continuous, though the band or belt is let go and seized by said mechanism, for the purpose set forth.

STUART PERRY.

Witnesses:
G. D. ROGERS,
WM. H. CHAPMAN.